(12) United States Patent
Rao et al.

(10) Patent No.: US 12,511,154 B2
(45) Date of Patent: Dec. 30, 2025

(54) APPLICATION-CENTRIC DESIGN FOR 5G AND EDGE COMPUTING APPLICATIONS

(71) Applicant: NEC Laboratories America, Inc., Princeton, NJ (US)

(72) Inventors: Kunal Rao, Monroe, NJ (US); Murugan Sankaradas, Dayton, NJ (US); Srimat Chakradhar, Manalapan, NJ (US)

(73) Assignee: NEC Corporation, Tokyo (JP)

(*) Notice: Subject to any disclaimer, the term of this patent is extended or adjusted under 35 U.S.C. 154(b) by 918 days.

(21) Appl. No.: 17/730,499

(22) Filed: Apr. 27, 2022

(65) Prior Publication Data

US 2022/0374259 A1    Nov. 24, 2022

Related U.S. Application Data

(60) Provisional application No. 63/188,639, filed on May 14, 2021, provisional application No. 63/309,030, filed on Feb. 11, 2022.

(51) Int. Cl.
*G06F 9/46* (2006.01)
*G06F 9/48* (2006.01)

(52) U.S. Cl.
CPC ................... *G06F 9/485* (2013.01)

(58) Field of Classification Search
CPC .......... G06F 9/485; G06F 9/5066; G06F 2009/4557; G06F 2009/45595; G06F 2009/45591; G06F 2009/45575; H04L 41/0895; H04L 41/0893; H04L 41/40; H04L 41/12; H04L 41/122
See application file for complete search history.

(56) References Cited

U.S. PATENT DOCUMENTS

| | | | |
|---|---|---|---|
| 6,370,560 B1* | 4/2002 | Robertazzi | G06F 9/5088 718/100 |
| 2008/0228893 A1* | 9/2008 | MacDonald | G06Q 30/0277 709/207 |
| 2017/0126506 A1* | 5/2017 | Padala | H04L 12/4641 |
| 2017/0228950 A1* | 8/2017 | Richmond | H04W 4/021 |
| 2017/0374032 A1* | 12/2017 | Woolward | H04L 63/0263 |

(Continued)

*Primary Examiner* — April Y Blair
*Assistant Examiner* — Zhi Chen
(74) *Attorney, Agent, or Firm* — Vincent Duffy; Joseph Kolodka

(57) ABSTRACT

A method for specifying and executing an application including multiple microservices on 5G slices within a multi-tiered 5G infrastructure is presented. The method includes managing compute requirements and network requirements of the application simultaneously by determining end-to-end application characteristics by employing an application slice specification including an application ID component, an application name component, an application metadata component, a function dependencies component, a function instances component, and an instance connections component, specifying a function slice specification including a function network slice specification and a function compute slice specification, and employing a runtime component including a resource manager, an application slice controller, and an application slice monitor, wherein the resource manager maintains a database and manages starting, stopping, updating, and deleting application instances.

18 Claims, 8 Drawing Sheets

(56) References Cited

U.S. PATENT DOCUMENTS

| | | | |
|---|---|---|---|
| 2019/0294350 A1* | 9/2019 | Hahn | G06F 3/0656 |
| 2020/0028896 A1* | 1/2020 | Veldanda | H04L 67/1014 |
| 2020/0052991 A1* | 2/2020 | Kodaypak | H04L 47/2416 |
| 2020/0119736 A1* | 4/2020 | Weber | H03K 19/17756 |
| 2021/0204198 A1* | 7/2021 | Xin | H04W 28/0268 |
| 2021/0297876 A1* | 9/2021 | Bellamkonda | G06N 20/00 |
| 2022/0124547 A1* | 4/2022 | Young | H04W 28/0247 |
| 2022/0138081 A1* | 5/2022 | Varma | G06F 11/3684 |
| | | | 717/124 |
| 2022/0217610 A1* | 7/2022 | Zheng | H04L 45/64 |
| 2022/0300296 A1* | 9/2022 | Sharma | G06F 9/4498 |

\* cited by examiner

APPLICATION-CENTRIC DESIGN FOR 5G AND EDGE COMPUTING APPLICATIONS

RELATED APPLICATION INFORMATION

This application claims priority to Provisional Application No. 63/188,639 filed on May 14, 2021, and Provisional Application No. 63/309,030 filed on Feb. 11, 2022, the contents of both of which are incorporated herein by reference in their entirety.

BACKGROUND

Technical Field

The present invention relates to 5G and edge computing applications and, more particularly, to a unified, application-centric specification called app slice, which considers both, compute and network requirements of an application.

Description of the Related Art

The advent of 5G and edge computing has enabled applications to run closer to the source of data and have high-bandwidth and low-latency communication between "things" in the Internet of Things and edge computing infrastructure where applications run. However, 5G and edge computing are progressing independently, where 5G infrastructure along with the network functions, and edge computing infrastructure with associated tools and frameworks are completely disparate. There is no coherent approach where the compute and network requirements of emerging 5G applications is considered within a single environment.

SUMMARY

A method for specifying and executing an application including multiple microservices on 5G slices within a multi-tiered 5G infrastructure is presented. The method includes managing compute requirements and network requirements of the application simultaneously by determining end-to-end application characteristics by employing an application slice specification including an application ID component, an application name component, an application metadata component, a function dependencies component, a function instances component, and an instance connections component, specifying a function slice specification including a function network slice specification and a function compute slice specification, and employing a runtime component including a resource manager, an application slice controller, and an application slice monitor, wherein the resource manager maintains a database and manages starting, stopping, updating, and deleting application instances.

A non-transitory computer-readable storage medium comprising a computer-readable program for specifying and executing an application including multiple microservices on 5G slices within a multi-tiered 5G infrastructure is presented. The computer-readable program when executed on a computer causes the computer to perform the steps of managing compute requirements and network requirements of the application simultaneously by determining end-to-end application characteristics by employing an application slice specification including an application ID component, an application name component, an application metadata component, a function dependencies component, a function instances component, and an instance connections component, specifying a function slice specification including a function network slice specification and a function compute slice specification, and employing a runtime component including a resource manager, an application slice controller, and an application slice monitor, wherein the resource manager maintains a database and manages starting, stopping, updating, and deleting application instances.

A system for specifying and executing an application including multiple microservices on 5G slices within a multi-tiered 5G infrastructure is presented. The system includes a memory and one or more processors in communication with the memory configured to manage compute requirements and network requirements of the application simultaneously by determining end-to-end application characteristics by employing an application slice specification including an application ID component, an application name component, an application metadata component, a function dependencies component, a function instances component, and an instance connections component, specifying a function slice specification including a function network slice specification and a function compute slice specification, and employing a runtime component including a resource manager, an application slice controller, and an application slice monitor, wherein the resource manager maintains a database and manages starting, stopping, updating, and deleting application instances.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
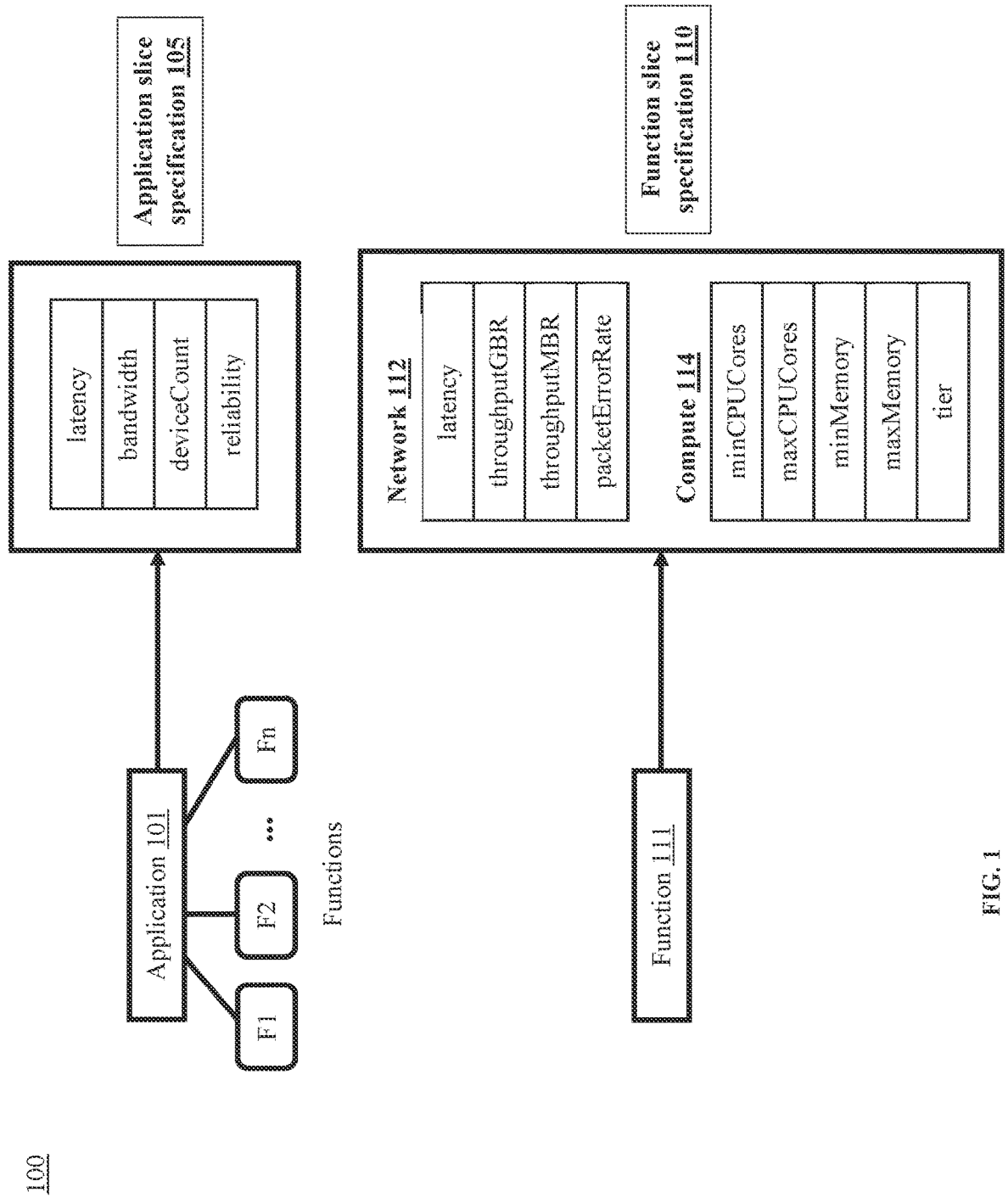
FIG. 1 is a block/flow diagram of an exemplary app slice specification, in accordance with embodiments of the present invention.

Edge computing is a terminology which refers to compute, storage, switching and control functions needed, that are relatively close to end users and Internet-of-Things (IoT) endpoints. Edge computing enables significant improvement in performance and associated quality of experience, and it can improve both efficiency and economics. Localizing applications in edge compute, close to end users, improves network transit latency. Latency and reliability are significant drivers in improved performance. Edge compute enables localization of data and efficient data processing. Also, industry and government regulations often require localization of data for security and privacy reasons.

For performance reasons, there is often a need to perform local processing of information to reduce the volume of traffic over transport resources. A decade ago, cloud computing enabled high value enterprise services with a global reach and scale, but with several minutes or seconds of delays. Today, on-demand and time-shifted HD or 4k video is streamed from the cloud with delays of hundreds of milliseconds. In the future, new applications such as tactile internet and virtual reality will require tens of milliseconds or sub-millisecond real-time response times, and they will use computing resources in proximity to where the content is created and consumed in the edge-cloud to reduce latency, rather than using cloud resources.

Central cloud compute environments will continue to operate and will be augmented with edge computing resources. Edge computing will provide capabilities to enable next generation devices. Most important data can be kept at the edge, and then remaining data can be shifted to centralized facilities. This allows edge technologies to deliver real-time, fast experiences to customers and provide the flexibility to meet industry requirements with centralized data storage.

Edge computing will make every device look and feel as if it is a highly responsive device. Critical data can be processed at the edge of the network, right on the device. Secondary systems and less urgent data can be sent to the cloud and processed there. With Software Defined Networking (SDN), organizations will have more flexibility to define rules on where and how data is processed to optimize application performance and user experience.

Edge computing, when paired with 5G, which promises faster speeds and lower latency, offers a future with near real-time connections. Applications that interact with humans in real-time require reduced latency between measurement and action. For example, when response times are around 10 ms, it is possible for humans to interact with distant objects with no perceived difference compared to interactions with a local object. Faster, 1-millisecond reaction time will be required when a human is expecting speed, such as when remotely controlling a visual scene and issuing commands that anticipate rapid response. Even faster, sub millisecond response times will be required for machine-to-machine communication as in Industry 4.0, where closed-loop real-time control systems automate processes like quality control.

Also, there are security implications of moving data processing closer to the network edge. SDN enables development of a layered approach to security that takes the communication layer, hardware layer and cloud security into consideration simultaneously. More specifically, for network edge clouds, Network Functions Virtualization (NFV) enables cloud levels of dynamics and flexibility for network implementation, which in turn is a key enabler for providing dynamic network slicing, which is beneficial for 5G services. Edge clouds are expected to be deployed at different levels of distribution, which may be phased-in over time. Core data centers, which exist in networks today, will continue to host centralized network functions.

5G networks are enabling unified communication technology for the networked world. 5G targets a wide range of applications in various verticals, including, industrial production, automotive, transportation, agriculture, healthcare, etc. 5G provides native support for machine-to-machine communications and IoT connectivity, which have significant potential to change society. For example, with the advent of Industry 4.0, several applications with wide-ranging requirements have emerged that connect people, objects, processes and systems in real-time. Industry 4.0 needs networks which span across a wide range of industrial domains including manufacturing, oil and gas, power generation/distribution, mining, and chemical processing. Such networks differ quite significantly from traditional enterprise/consumer networks in terms of service requirements.

Key connectivity requirements in terms of latency and throughput vary widely, but 5G capability enables a wide variety of industrial applications like remote operation, remote maintenance, augmented reality, mobile workforce and enterprise applications such as payments, tactile, V2X, real-time surveillance, etc. Often these applications have latency requirements to be under 0.5 to 10 milliseconds, very high data rate capacity in the order of 10 to 1000 Mbps and with high density in the scale of 1000s of nodes. V2X applications have high reliability and very low latency requirements as they need to make life and death decisions while vehicles are moving at high speed.

Network slicing unlocks the potential of 5G for various verticals. Before the dawn of the 5G era, cellular networks had a one size fits all approach for solutions. The key principle behind network slicing is to instantiate multiple logical networks across a common physical fabric so that each logical network is tailored to the individual requirements of applications. Network slice is a collection of network functions and specific radio access technology settings which are customized for a specific use case. Slices will be realized on a common infrastructure, which shares compute, network, as well as a spectrum license. This allows efficient utilization of infrastructure and assets utilization, which leads to cost and energy efficient implementations. Network slicing provides isolation from business, technical, functional, and operational perspectives. Network slicing can be viewed as a means to create a dedicated network with predefined quality of service within a network to deliver new generation services. In simpler words, network slicing can be viewed as an isolated private 5G network dedicated inside a public 5G network. Slicing provides the ability to isolate traffic in an end-to-end manner, which enables strict performance guarantees in multi-tenant and multi-service conditions. Network slicing also offers isolation in terms of computing, storage, and networking resources.

Slice based abstraction of emerging applications is key to achieving operational requirements in terms of being real-time, reliable and responsive. The exemplary embodiments take a real-time monitoring video analytics application, which has high throughput, low latency and reliability constraints for effective performance. Application requirements in terms of latency, bandwidth and reliability, often vary dynamically which impacts both, network requirements and compute requirements. By dynamically fine-tuning network parameters and compute parameters, services can have their underlying platforms constantly customized according to their changing needs. 5G specifies two mechanisms for network slicing. First is soft network slicing and second is hard network slicing. Soft network slicing is based on quality of service (QoS) techniques, which perform dynamic allocation of available network resources to different classes of traffic. In case of long-term evolution (LTE), it is primarily achieved by assigning a QoS Class Index (QCI) to each traffic class by the user device and in the case of 5G, it is achieved by using a 5G QOS identifier (5QI). Hard network slicing utilizes virtualization and component dis-aggregation to achieve slicing.

An application requires compute as well as network resources to perform various application functions. Currently, network resources and compute resources are treated and managed independently. There is no coherent approach towards considering them simultaneously for the benefit of overall application. Networking vendors provide network resource guarantees without considering application compute requirements and orchestration frameworks such as Kubernetes, which provides compute resource guarantees without considering the networking requirements of an application. Moreover, network resource guarantees are application agnostic and compute resource guarantees are within a specific tier in the layered computing tier architecture. This siloed approach towards compute and network resources does not work well for an application, where compute and network resources need to be jointly optimized for the overall good health and smooth operation of an application within and across computing tiers.

Data needs to be moved over the network with the speed and reliability needed by the application and at the same time enough compute resources need to be available so that this data can be processed in real-time to realize various application functions. If compute and network resources are treated independently, then the overall application suffers, that is, if network resources are enough and data can flow through the network but compute resources aren't enough to process the data or if compute resources are abundant, but network resources aren't enough to move the data over. In either case, the application suffers and fails to deliver its functions. Compute and network resource requirements of the application need to be statically identified, e.g., by profiling the application, and granted to the application even before it starts running.

Along with the static allocation of compute and network resources, there is also a need to continuously monitor the application behavior at runtime to determine if the statically allocated resources are enough for the application to deliver its functionalities. If they are not enough, e.g., due to changes in the operating conditions, then the static allocation of resources needs to be re-adjusted so that the application dynamically receives enough compute and network resources to respond to the new operating conditions and continue smooth operation. This dynamic adjustment of resources is important for the application and requires consideration of both, compute and network resources.

Thus, to have a unified view and manage compute as well as network resource requirements of an application simultaneously, there is a need for a top-level abstraction. The top-level abstraction is referred to as app slice, which considers the compute as well as the network resource requirements of an application. The exemplary embodiments consider the compute requirements in a compute slice and the network requirements in a network slice and enable a combined and coherent app slice specification and runtime.

An application can be developed using monolithic or microservices-based architecture. In a monolithic architecture, the entire application is developed and deployed as a single entity, whereas in a microservices-based architecture the application is decomposed into smaller entities, that is, tasks or microservices, which are developed and deployed independently and then inter-connected to deliver the entire application functionality. The app slice specification is designed in such a way that both these types of architectures are covered.

FIG. 1 shows the app slice specification 100, which includes a top-level application slice specification 105 and then if the application is decomposed into smaller functions (microservices as functions), then for each function, the compute and network slice specifications are included (function slice specification 110). For a monolithic architecture there is only single function, whereas for a microservices architecture there could be many functions.

Regarding the application slice specification 105, this part of the app slice specification 105 can be used to specify desired end-to-end application characteristics.

There are four parameters in specification 105.

Regarding the latency parameter, each application 101 has certain end-to-end latency requirements, that is, the output should be returned within a specific amount of time. "latency" in this case includes processing time as well as time spent in the network. This total time between when the data is produced, sent for processing over the network, actual processing happening (compute), and output being returned (again over the network) for one unit of work, determines the end-to-end application latency. This desired "latency" is specified in milliseconds and is the maximum tolerable end-to-end latency for the application. If the latency is greater than the specified value, then there is no utility for the application output.

Regarding the bandwidth parameter, based on the network characteristics of the application 101, it may require a certain amount of bandwidth. This required bandwidth for the application 101 is specified in this parameter and the unit is in kilobits per second (kbps).

Regarding the deviceCount parameter, the connection density for an application 101 is specified through this parameter. Connection density includes the total number of other devices the application 101 connects to.

Regarding the reliability parameter, the reliability for the application resource requirements is specified through this parameter. The value is between 0 and 1, where 0 is unreliable and 1 is totally reliable.

These application-level slice specifications translate to various types of slicing in 5G, such as "eMBB," "uRLLC" or "mMTC." "eMBB" (enhanced Mobile Broadband) slice type is for applications requiring high communication bandwidth. "uRLLC" (Ultra Reliable Low Latency Communications) slice type is for applications that require low latency and high reliability. "mMTC" (massive Machine Type Communications) slice type is for applications with high connection density.

Regarding the function network slice specification 110, each function 111 requires a certain kind of network characteristic to continue operating properly without degradation in the quality of output that it produces. Particularly, this applies to the data that is being received by the function 111. If the input data is being received as per the needs of the function, then the processing can happen as desired, and the output can be produced appropriately. These network characteristics that are desired by the function 111 on the input side are specified as part of the function network slice specification 112.

There are a total of four network parameters that form part of the function network slice specification 112:

Regarding the latency parameter, this parameter specifies the maximum tolerable latency in milliseconds. This is the time in which the function expects to receive the packets, failing which, the output produced by the function cannot be guaranteed to be correct. If the actual latency is less than this desired latency, that should be okay, but it should not be more. In fact, the lower the latency than desired, the better it is for the function 111.

Regarding the throughputGBR parameter, functions require the input data stream to arrive at a certain rate, which is the desired throughput (specified in kbps) and needs to be guaranteed for the function to perform well (GBR stands for Guaranteed Bit Rate). This desired throughput is especially beneficial for streaming input data, where there is a continuous data stream that the function receives, which needs to be processed at a certain rate to keep up with the incoming input stream and produce correct output.

Regarding the throughputMBR parameter, this parameter specifies the maximum throughput (MBR stands for Maximum Bit Rate) that the function can consume. Anything higher than this will not be used by the function.

Regarding the packetErrorRate parameter, one important aspect of network characteristics is how reliably they can transfer packets. The "packetErrorRate" parameter is the ratio of the number of incorrectly received packets and the total number of received packets. Some functions 111 can tolerate packet errors at a certain rate, while others can tolerate packet errors at another rate. This rate that the function can tolerate is specified through this parameter.

Regarding the function compute slice specification 114, along with the network characteristics, functions 111 also need to have certain compute characteristics, which need to be met for the function to perform well. If the available resource for computation isn't enough then even though the network characteristics are met, the function will not perform well. Therefore, for overall smooth operation, both, network and compute requirements of the function 111 should be taken into consideration. This part of the slice specification is for the compute slice that is desired by the function 111.

There are a total of five compute parameters that form part of the function compute slice specification.

Regarding the minCPUCores parameter, CPU resources are specified in terms of absolute cpu units. 1 represents either 1 vCPU/core on the cloud or 1 hyperthread on bare-metal Intel processors. 1 cpu unit is divided into 1000 "millicpus" and the finest granularity that can be specified is "1 m" (1 millicpu). "minCPUCores" parameter specifies the minimum CPU cores that are desired by the function 111. This will be guaranteed for the function, similar to "throughputGBR," which is a guaranteed bit rate for the network. "minCPUCores" can be specified as a fraction between 0 to 1, or in terms of number of millicpus or millicores. Specifying 100 m is the same as specifying 0.1 for this parameter.

Regarding the maxCPUCores parameter, this parameter specifies the maximum CPU cores that the function 111 can use. CPU resources higher than this cannot be used by the function 111. This is similar to "throughputMBR," which is the maximum bit rate the function 111 can consume. The unit for specification for "maxCPUCores" is the same as that used for "minCPUCores," that is, it can either be specified as a fraction between 0 to 1 or in terms of millicpus. Specifying 0.5 is the same as specifying 500 m.

Regarding the minMemory parameter, memory resources are specified as either bytes (plain numbers) or as fixed-point numbers with one of these suffixes: E, P, T, G, M, K or even as power-of two equivalents: Ei, Pi, Ti, Gi, Mi, Ki. Parameter "minMemory" specifies the minimum amount of memory that is desired by the function 111. If the available memory is less than this, then the function 111 may not run properly and may even crash. Thus, to avoid this scenario, the function 111 can specify in this parameter the minimum amount of memory required for it to work properly. Specifying 500M is roughly the same as specifying 500000000 (bytes) or 476.8 MiB (mebibytes).

Regarding the maxMemory parameter, the maximum amount of memory that the function can use is specified by this parameter. The units are similar to "minMemory." Specifying 800M is roughly similar to specifying 800000000 (bytes) or 762.9 (mebibytes).

Regarding the tier parameter, this is an optional parameter that can be specified if the function has to run on a specific tier in the computing fabric. It can have one of the three values: "device," "edge" or "cloud." The default value for this is "auto," indicating that the function 111 can run anywhere in the computing fabric. However, if that is not the case, then this parameter can be used to specify where exactly in which tier the function 111 needs to run.

Note the tier parameter in the compute slice specification 114 provides the capability to automatically map and execute a function 111 across multiple tiers. This kind of functionality is not available out-of-the-box in typical orchestration frameworks like Kubernetes and therefore requires additional consideration when mapping and executing functions across tiers in a computing stack.

Breaking down individual functionalities of an application into microservices and then combining microservices and interconnecting them to realize the entire application functionality has become a popular programming paradigm. The individual microservices are referred to as functions 111 and applications 101 can include several inter-connected functions 111.

Figure 2:
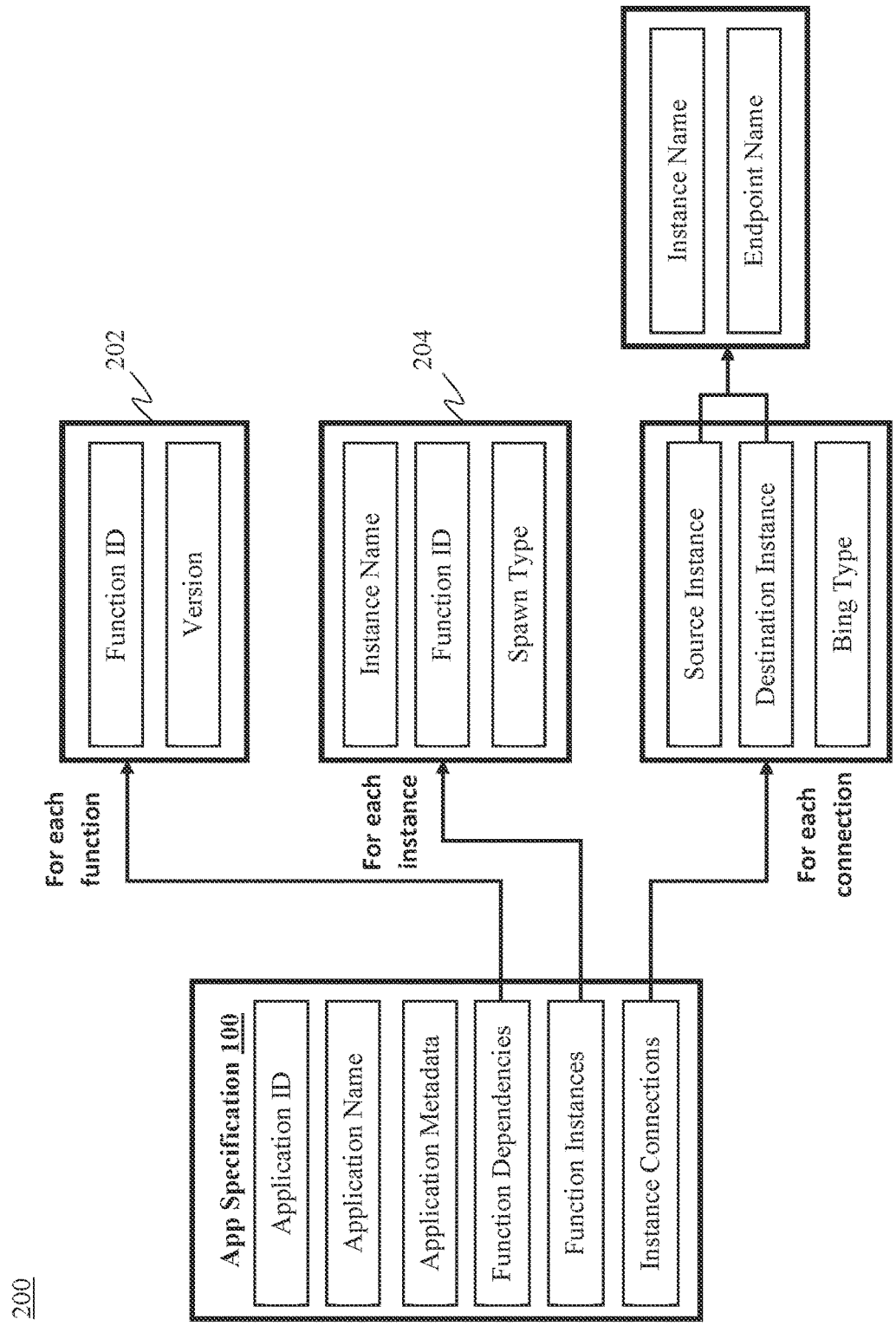
FIG. 2 is a block/flow diagram of exemplary components of an application specification, in accordance with embodiments of the present invention.

Various components 200 of the application specification 100 are shown in FIG. 2. It starts by specifying an identifier for the application, called as Application ID. This ID is internally used by the runtime system to map to the specific application and retrieve details of the application. Next, a name is specified for the application. Any other metadata related to the application is specified next. This metadata can include the version number of the application, any description associated with the application, a URL, where more details related to the application can be found, the operating system and architecture on which the application runs, maintainer of the application, etc. During realization, an instance of the application is created, which includes instances of individual functions. These function dependencies, function instances and instance connections are specified next.

Function dependencies specification includes the various functions 202 that constitute the application. For each function, the function ID, which is the identifier for the function, and the function version number is specified. Function instances specification includes the various function instances 204 that need to be generated as part of the application. For each instance, the name of the instance, function ID corresponding to the instance, and spawn type of the instance needs to be specified. Spawn type of the instance can be one of the five spawn types, such as, new, reuse, dynamic, uniqueNodeWide or uniqueSiteWide.

Each of these spawn types is described below:

Regarding the "New" spawn type, the runtime system will always create a new instance of the function, if this spawn type is specified.

Regarding the "Reuse" spawn type, the runtime system will first check if there is any other instance of the function already running with the same configuration. If so, the runtime system will reuse that instance, during execution of the application. If no instance is found that matches the configuration, then a new instance is created by the runtime system.

Regarding the "dynamic" spawn type, the runtime system will not create this instance when the application starts, rather this instance will be dynamically created, after the application execution has already begun.

Regarding the "UniqueNodeWide" spawn type, the runtime system will first check if there is any other instance of the function already running on the specified node/machine with the same configuration. The runtime system generates a new instance, if there is no other instance already running on the specified node/machine that matches the instance configuration. If there is an instance already running on the node/machine that matches the instance configuration, then the runtime system uses that instance, during execution of the application. For an instance with this spawn type, only a single instance of the function is created and run on a particular node.

Regarding the "UniqueSiteWide' spawn type, the runtime system will first check if there is another instance of the function already running. If so, then the runtime system uses that instance, during execution of the application. If there is no instance already running, then a new instance is generated and started. For an instance with this spawn type, only a single instance of the function is generated and run across the site-wide deployment. Instance connections specification includes connections between various function instances. For each connection, the source instance, destination instance and the binding information are specified, that is whether the source or the destination instance binds are specified. For each source and destination instance, the name of the instance and the name of the endpoint for the connection is specified.

Figure 3:
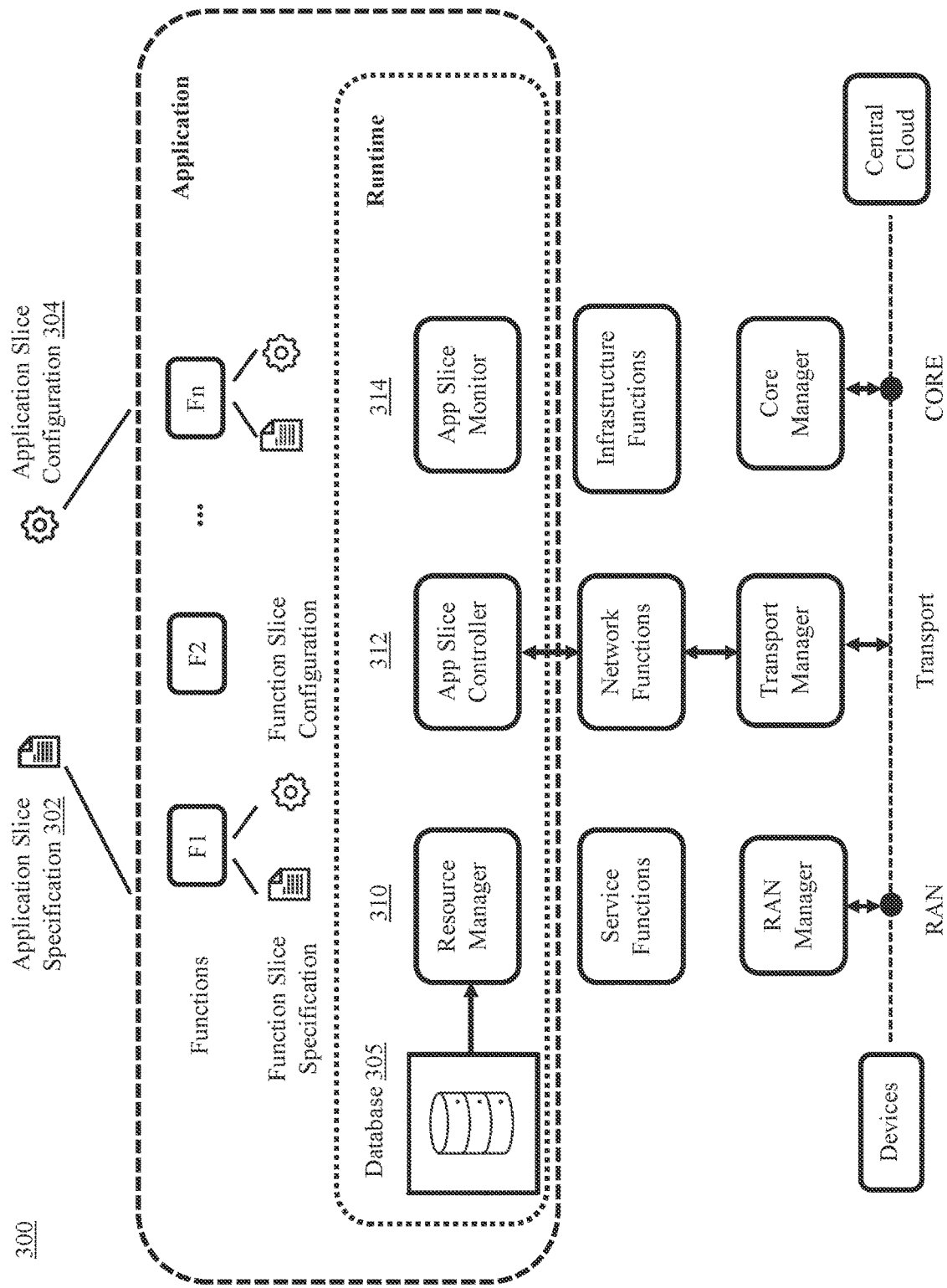
FIG. 3 is a block/flow diagram of an exemplary app slice runtime, in accordance with embodiments of the present invention.

After the app specification and app slice specification is described, the actual realization and execution is handled by the app slice runtime. The runtime 300, shown in FIG. 3, sits on top of the underlying compute and network infrastructure and is integrated with the application itself. Input to the runtime is the application specification and application slice specification 302, along with the application slice configuration 304 to be used for the application instances and associated slices. Using these as the input and having knowledge of the underlying infrastructure, the runtime system 300 manages creation or generation of application instances with the provided configuration, creation or generation of appropriate slices with requested configuration, allocating requested compute and network resources to individual function instances, scheduling instances on appropriate tiers with appropriate slices, and monitoring and ensuring overall smooth operation of individual functions and the entire application. There are three components within the runtime that is, Resource Manager 310, App Slice Controller 312, and App Slice Monitor 314.

The Resource Manager (RM) 310 is the heart of the runtime system 300, which manages the actual realization and execution, in co-ordination with Slice Controller 312 and Slice Monitor 314. Application and slice specifications are received by RM 310, and all requests to start, stop or update instances of an application are also received by RM 310. RM 310 maintains a database 305, where all the application and slice specifications, configuration of various instances, their status, underlying compute and network infrastructure details, etc. are stored.

Figure 4:
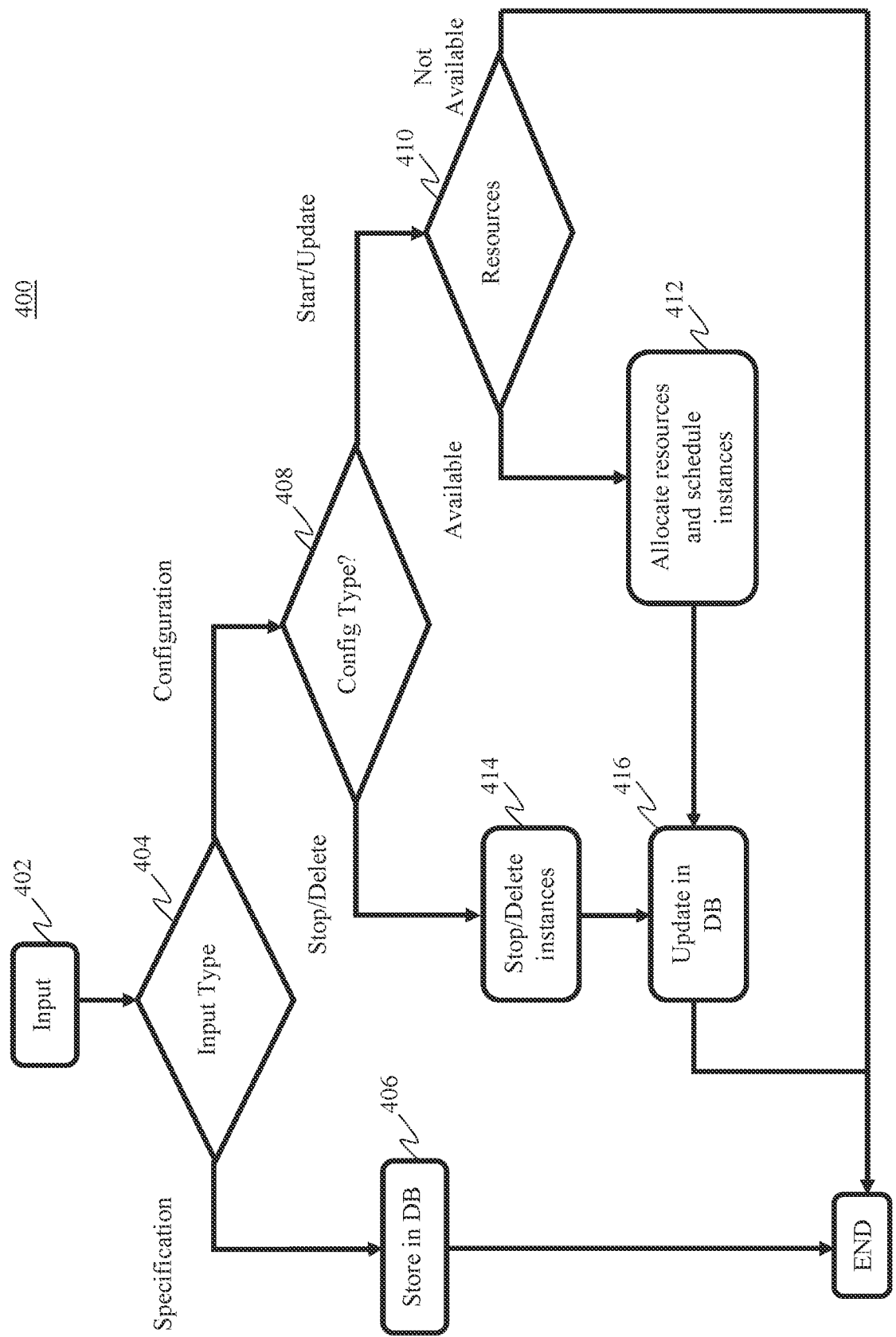
FIG. 4 is a block/flow diagram illustrating a flowchart of a resource manager, in accordance with embodiments of the present invention.

FIG. 4 shows a flowchart 400 showing the procedure followed by RM 310 for any input. When an input 402 arrives, RM 310 first checks if the input is for the specification or configuration (404) for an application or slice. If it is a specification, then the particular specification is stored in the database (406). There is no further action on the input and the procedure ends. If the input is for a configuration, then the corresponding action is retrieved (408).

If it is to start or update an application, then RM 310 checks if the required compute and network resources as requested in the configuration (410) are available in the underlying infrastructure. If they are available, then the corresponding resources are allocated to the various function instances and the instances are scheduled to run (412). To run the application instance, RM 310 retrieves the application specification from the database, creates or generates all function instances based on the spawnType and makes all the specified connections between various instances, and finally allocates the resources to these instances and schedules them to run on the underlying infrastructure. This is then updated in the database (416) and the procedure ends. If the action is to stop or delete, then the corresponding function instances are stopped or deleted (414), their status is updated in the database and the procedure ends.

---

Algorithm 1 RM resource allocation

---

Input: Resource request per function (for application)
Output: Allocated Resources per function (for application)
  1: ▷ key: function, value: allocated tier resources
  2: Initialize map → resources
  3: for function ∈ functions do
  4:    ▷ Order tiers in ascending order of resource cost
  5:    ▷ Cheaper tiers are checked before expensive ones
  6:    for tier ∈ tiers do
  7:       ▷ Match requested with available tier resources
  8:       if matchResoures(c_r, n_r, tc_r, tn_r) then
  9:          ▷ Allocate tier resources to function
10:          resources[app] ← tc_r, tn_r;
11:          break;
12:       end if
13:    end for
14: end for
15: ▷ Return allocated resources
16: return resources

---

While checking the availability of resources, RM 310 first checks application-level slice specifications, then for each individual functions, RM 310 follows the algorithm shown in Algorithm 1 above. Each of the functions, which form the application, is checked one by one for availability of resources in one of the tiers. These tiers are sorted in such a way that the cheaper tiers are checked first, followed by the more expensive ones. Thus, for each function, the requested compute and network resources, denoted as $c\_r$ and $n\_r$ respectively, are checked with the corresponding compute and network resources in the tier, denoted as $tc\_r$ and $tn\_r$, respectively. All parameters mentioned in compute slice specification, that is, minCPUCores, maxCPUCores, minMemory, maxMemory, and tier, together are considered in compute resource requirements, and all parameters mentioned in network slice specification, that is, latency, throughputGBR, throughputMBR and packetErrorRate, together are considered in network resource requirements. If the requested resources are less than the available resources, then the resources (compute and network) in that tier are allocated to the function. For functions where tier is explicitly specified and is not auto, then only that particular tier is checked for resource availability and all other tiers are ignored. This repeats for each function across all the tiers and cheapest tier that meets the function resource requests is allocated to the function. If the resource request cannot be met for the application and all associated functions, then RM 310 reports it, and leaves it to the application and associated functions to take appropriate actions, and updates in the DB accordingly.

| Algorithm 2 RM dynamic resource adjustment |
| --- |
| 1: while true do |
| 2:   for function ∈ function do |
| 3:     ▷ check if resource conditions have changed |
| 4:     if resourceConditionChanged(c_r, n_r) then |
| 5:       ▷ check if new resources are available |
| 6:       resources ← getResources(c_r, n_r) |
| 7:       if resources then |
| 8:         ▷ schedule on new resources |
| 9:         scheduleFunction(function, resources) |
| 10:       else |
| 11:         ▷ report error for the function |
| 12:         reportError(function) |
| 13:       end if |
| 14:     end if |
| 15:   end for |
| 16:   sleep(interval) |
| 17: end while |

As various functions continue to run, RM 310 periodically monitors the status of these functions and adjusts the resources, if needed. To do so, RM 310 follows Algorithm 2 above, where at every interval seconds, which is configurable, RM 310 checks across all the running functions. Specifically, if the resource requirements of the function are being met or not is being checked by the allocated tier compute and network resources. If for whatever reason, e.g., change in operating conditions/input content, network disruption or hardware failure, the network or compute resources are found to be insufficient, then RM 310 tries to find additional resources.

Here also, as before, cheaper tiers are checked before the more expensive ones, and the cheapest tier that can meet the resource requests of the function is allocated to the function, and the function is scheduled to run on this newly found tier resource. If none of the tiers have the resource availability, then RM 310 reports this as an error for the particular function and leaves it up to the function to take appropriate actions. Along with checking if additional resources are needed, RM 310 also checks if too many resources have been allocated due to previous changed conditions and cuts it down if conditions have changed again and less resources are needed now. In such cases, RM 310 reduces the overall compute and network resource usage. RM 310 thus dynamically monitors and adjusts compute and network resources for functions and ensures smooth operation. As a result, RM 310 performs initial static resource management and then dynamic resource management across tiers in coordination with App Slice Controller 312, and App Slice Monitor 314.

Note that at any point in time, the compute and network resource requirement specified in the original specification is always provided to the functions. Only additional resources, if needed, are granted and shrunk back dynamically. RM 310 communicates with the App Slice Controller 312 to setup the compute and network slices and run the function on an underlying orchestration platform such as Kubernetes.

Figure 5:
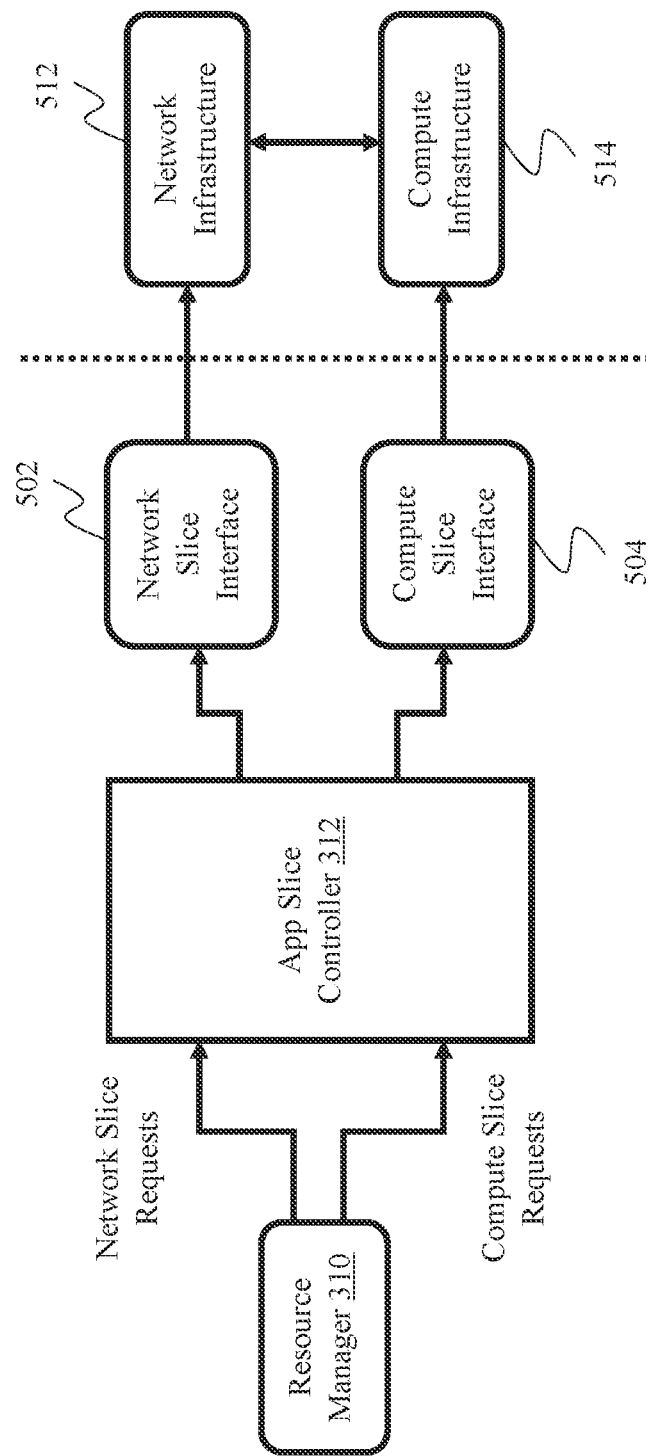
FIG. 5 is a block/flow diagram of an exemplary app slice controller, in accordance with embodiments of the present invention.

Regarding the App Slice Controller (ASC) 312 shown in FIG. 5, ASC 312 follows the directions from RM 310 and manages the slicing, including compute and network slicing for functions. When RM 310 signals ASC 312 to create a network slice, ASC 312 communicates with the network slice interface 502 to create network slices in the underlying network infrastructure 512. Since existing network vendors like Celona do not provide admission control while allowing creation of network slicing, the exemplary methods built a custom layer which operates on top of Celona APIs and provides guarantees and admission control before allowing creation of network slices. This may lead to underutilization of the network if the actual usage is less than the requested usage, but the exemplary methods need this in order to provide network guarantees. The exemplary methods expose this custom layer as the network slice interface for ASC 312. Thus, by going through this customer network slice interface layer, ASC 312 creates a network slice that meets the requirements of the functions, including latency, throughputGBR, throughputMBR and packetErrorRate. Based on these network requirements, appropriate QCI level and priority is selected and network slice to meet function network requirements is created.

When ASC 312 receives a signal to create a compute slice, then underlying orchestration platforms capabilities are used, through the compute slice interface 504, to associate the compute requirements of the function with the underlying compute infrastructure 514. Particularly, minCPUCores, maxCPUCores, minMemory and maxMemory are used to set the compute "requests" and "limits" for the corresponding function containers running on an orchestration platform, like Kubernetes, which provides admission control before granting the requested resources. Along with creation of these compute and network slices, ASC 312 also manages updating and deleting of these slices. For network slice update or delete requests, ASC 312 communicates with the underlying network slice interface to either update or delete a particular network slice. If the request is to update or delete a compute slice, then ASC 312 communicates with the orchestration platform's compute slice interface to either update or delete the specific compute slice.

Regarding the App Slice Monitor (ASM), ASM 314 keeps monitoring and collecting various metrics for the compute and network slices that were created by ASC 312. These metrics are made available to RM 310 periodically, at specific configurable intervals, as well as on-demand and is used by RM 310 to make resource allocation and scheduling decisions. To obtain network slice metrics, ASM 314 communicates with the network slice interface, and collects metrics data for each individual network slice that is running in the system, and to obtain compute slice metrics, ASM 314 communicates with the orchestration platform's compute slice interface and collects metrics data for each individual compute slice that is running in the system. This network and compute slice data includes the requested resources, currently used resources, history of the overall usage and any anomalous usage behavior. Such data is useful for RM 310 to make dynamic resource allocation and scheduling decisions, if needed, for already running functions.

In conclusion, the exemplary embodiments of the present invention present a unified, application-centric specification called app slice, which considers both, compute and network requirements of an application. To realize this app slice specification, the exemplary methods propose a novel app slice runtime, which ensures that the application receives the required compute and network resources at all times. Together with the app slice specification and runtime, the exemplary invention aids in deploying emerging 5G applications in a multi-tiered, complex and dynamic 5G infrastructure.

The exemplary embodiments of the present invention further present:

A system and method to specify and execute an application including multiple microservices/functions on 5G slices within complex and dynamic, multi-tiered 5G infrastructures.

A system and method to specify application-level requirements and individual function-level requirements, which consider the network slice requirements as well as the compute slice requirements.

A system and method to specify an application structure including various functions, how they need to be executed, what are their inter-connections, which along with the compute and network slice requirements is utilized for execution on 5G slices.

A system and method for actual realization and execution of the specification within complex and dynamic 5G infrastructures using a runtime component, wherein the application structure, application-level and function-level requirements and the application configuration are provided as input to the runtime system.

A system and method to handle various inputs through a resource manager, which maintains a database and manages starting, stopping, updating and deleting application instances.

A system and method to check application-level requirements and function-level requirements, including network slice requirements and compute slice requirements, across various tiers in a multi-tiered computing and networking fabric and assign resources, if available, starting from least expensive to most expensive tiers, while ensuring that the requirements mentioned in the specification are met.

A system and method to report back to the application when the requirements cannot be met by the underlying compute and network infrastructure, thereby allowing the application to take graceful actions.

A system and method to periodically monitor the application and make dynamic adjustments to compute and network resource assignments in case they are found to be insufficient for whatever reason, e.g., change in operating conditions/input content, network disruption, hardware failure, etc. and ensure smooth end-to-end operation of the entire application.

A system and method to allocate cheaper tiers before expensive one's (while ensuring that the requirements are met), during dynamic adjustment of compute and network resources.

A system and method to expose a unified layer (App slice controller), which interfaces with the computing and networking infrastructure in order to manage network as well as compute slices within the 5G infrastructure.

A system and method to expose the unified layer to the resource manager and simplify the handling of compute and network slice requests.

A system and method to monitor network and compute slices and make various metrics (requested resources, currently used resources, history of the overall usage and any anomalous usage behavior, etc.) available to the resource manager for making dynamic resource allocation and scheduling decisions.

Figure 6:
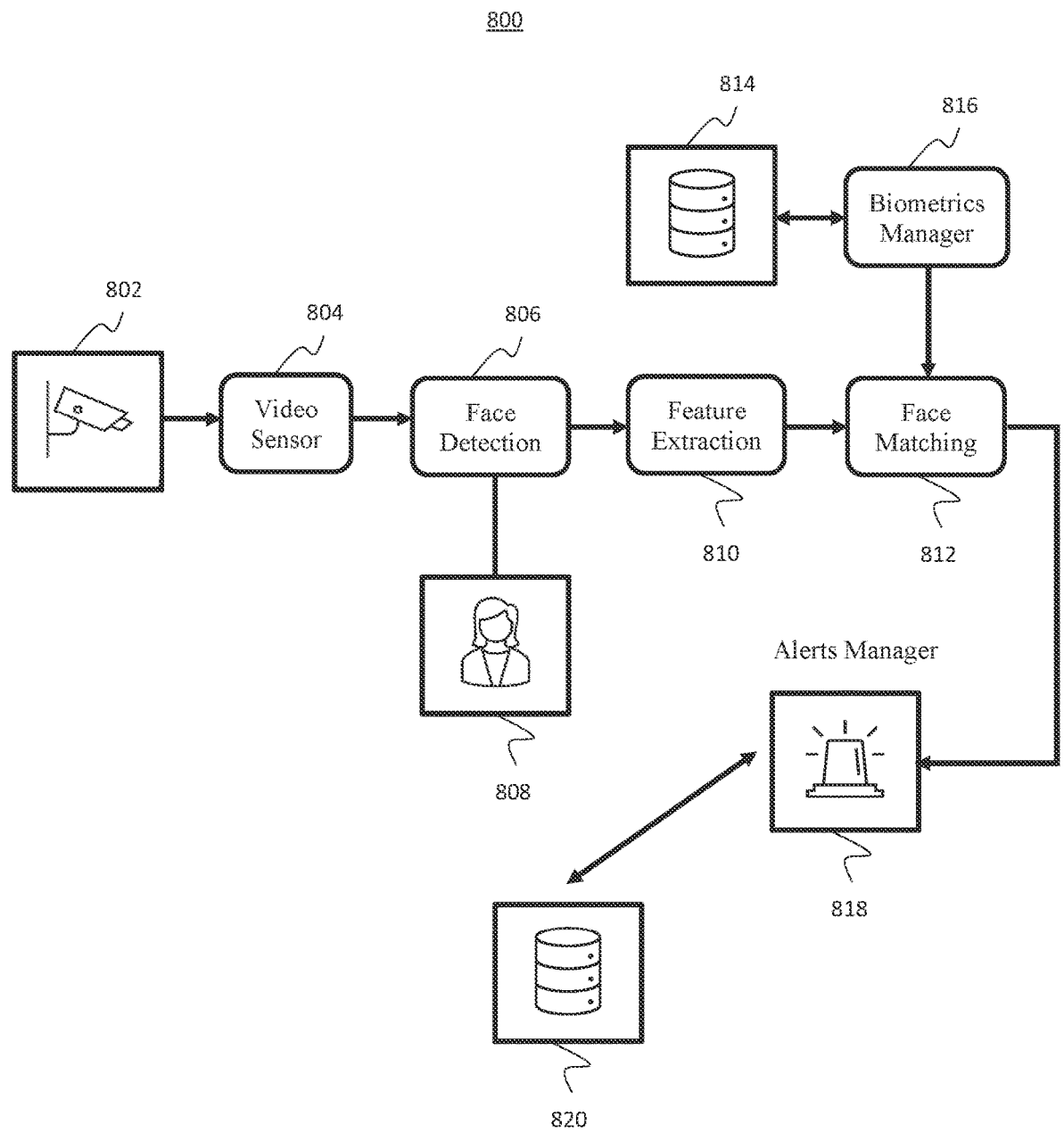
FIG. 6 is an exemplary practical application for specifying and executing an application including multiple microservices on 5G slices within a multi-tiered 5G infrastructure, in accordance with embodiments of the present invention.

FIG. 6 is a block/flow diagram 800 of a practical application for specifying and executing an application including multiple microservices on 5G slices within a multi-tiered 5G infrastructure, in accordance with embodiments of the present invention.

In one practical example, a face recognition-based video analytics application, called real-time monitoring or watchlist, is illustrated including its app slice and application specifications. Real-time monitoring applications enable governments and organizations to leverage face matching capabilities for safety, security and operational efficiency. This application can provide fast and reliable identification of known and unknown individuals under real-world challenges, including lighting, angles, facial hair, pose, glasses and other occlusions, motion, crowds, and expression. Various components/functions of this application, along with the pipeline is shown in FIG. 6.

In one practical application, video feed from camera 802 is decoded by "Video Sensor" 804 and frames are made available to "Face Detection" component 806, which detects faces 808 and makes them available to the "Feature Extraction" component 810. Unique face templates, such as features are then extracted and made available to the "Face Matching" component 812, which compares and matches these features with a gallery of face features 814, obtained from "Biometrics Manager" component 816. All matches are then sent to the "Alerts Manager" component 818, where they are stored 820 and also made available to any third-party application.

Figure 7:
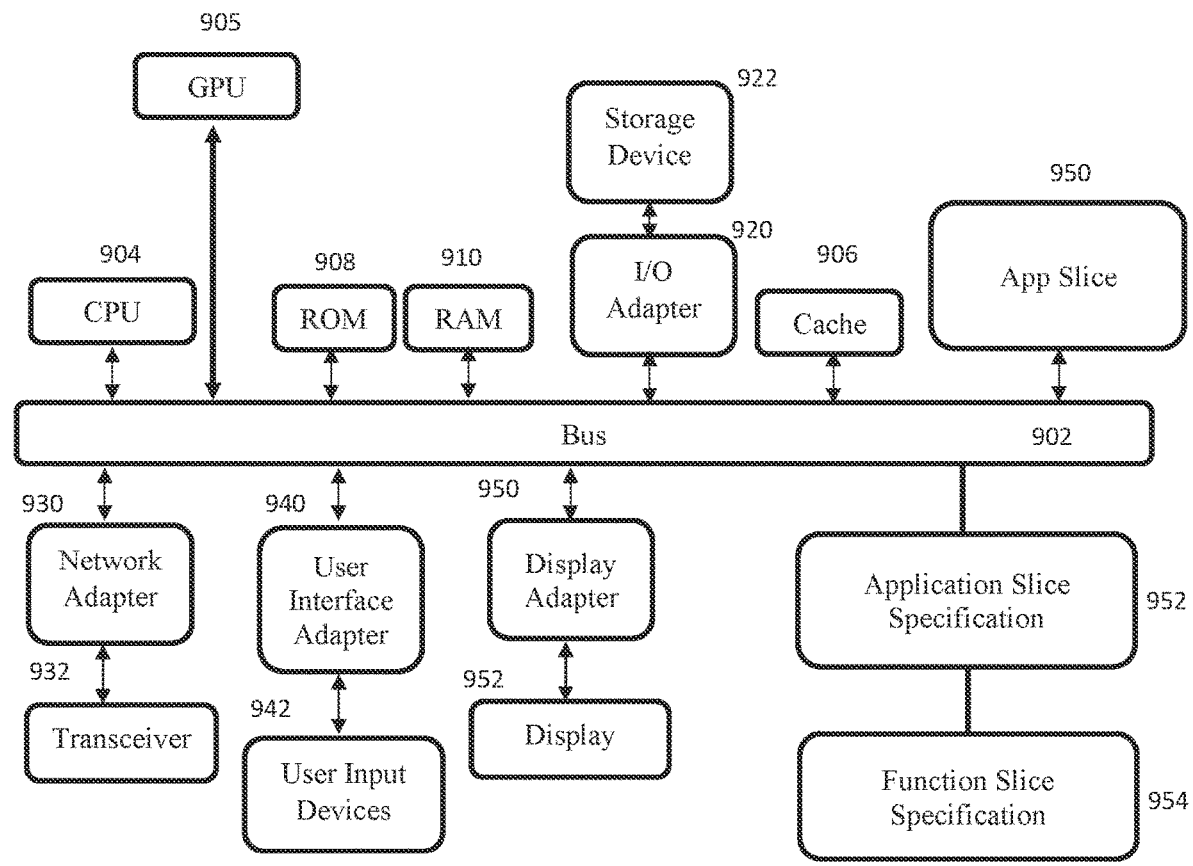
FIG. 7 is an exemplary processing system for specifying and executing an application including multiple microservices on 5G slices within a multi-tiered 5G infrastructure, in accordance with embodiments of the present invention.

FIG. 7 is an exemplary processing system for specifying and executing an application including multiple microservices on 5G slices within a multi-tiered 5G infrastructure, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the app slice 950 includes an application slice specification 952 and a function slice specification 954.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
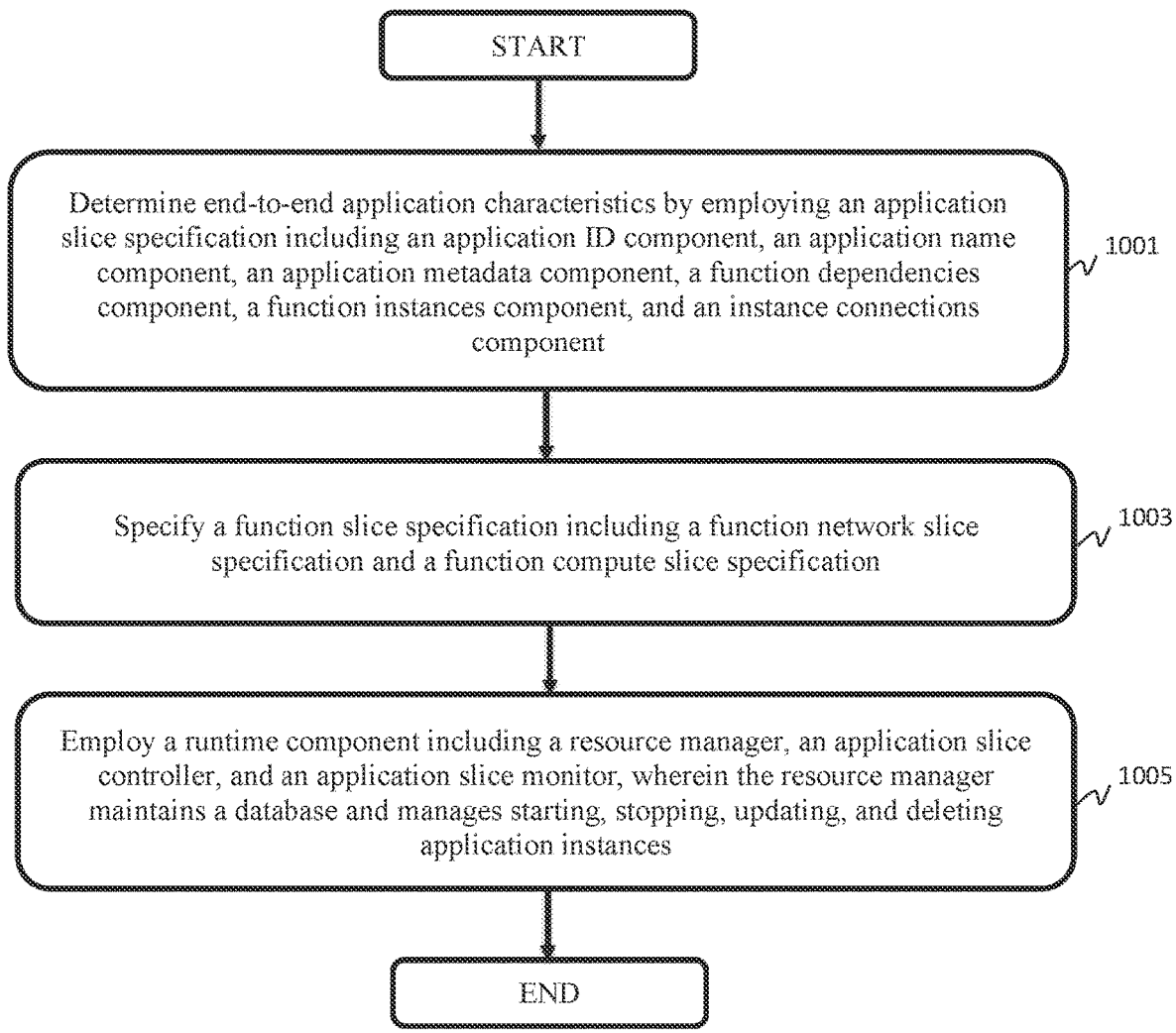
FIG. 8 is a block/flow diagram of an exemplary method for specifying and executing an application including multiple microservices on 5G slices within a multi-tiered 5G infrastructure, in accordance with embodiments of the present invention.

FIG. 8 is a block/flow diagram of an exemplary method for specifying and executing an application including multiple microservices on 5G slices within a multi-tiered 5G infrastructure, in accordance with embodiments of the present invention.

The compute requirements and the network requirements of the application are managed simultaneously by:

At block 1001, determine end-to-end application characteristics by employing an application slice specification including an application ID component, an application name component, an application metadata component, a function dependencies component, a function instances component, and an instance connections component.

At block 1003, specify a function slice specification including a function network slice specification and a function compute slice specification.

At block 1005, employ a runtime component including a resource manager, an application slice controller, and an application slice monitor, wherein the resource manager maintains a database and manages starting, stopping, updating, and deleting application instances.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for specifying and executing an application including multiple microservices on 5G slices within a multi-tiered 5G infrastructure, the method comprising:
   managing compute requirements and network requirements of the application simultaneously by:
      determining end-to-end application characteristics by employing an application slice specification including an application ID component, an application name component, an application metadata component, a function dependencies component, a function instances component, and an instance connections component;
      specifying a function slice specification including a function network slice specification and a function compute slice specification that includes a tier parameter that maps a function across multiple tiers; and
      employing a runtime component including a resource manager, an application slice controller, and an application slice monitor, wherein the resource manager maintains a database and manages starting, stopping, updating, and deleting application instances, the resource manager initially performing static resource management that allocates resources in each tier specified by the tier parameter to a corresponding function according to requirements specified in the function slice specification in an order of cheapest tier first followed by more expensive tier and then performing dynamic resource management across tiers in coordination with the application slice controller and the application slice monitor.

2. The method of claim 1, wherein the application slice specification includes a latency parameter, a bandwidth parameter, a deviceCount parameter, and a reliability parameter.

3. The method of claim 1, wherein the function network slice specification includes a latency parameter, a throughputGBR parameter, a throughputMBR parameter, and packetErrorRate parameter.

4. The method of claim 1, wherein the function compute slice specification further includes a minCPUCores parameter, a maxCPUCores parameter, a minMemory parameter, and a maxMemory parameter.

5. The method of claim 1, wherein the application slice controller manages compute slicing and network slicing for functions by employing a network slice interface layer providing guarantees and admission control before network slice generation.

6. The method of claim 5, wherein the application slice monitor monitors and collects metrics for the compute slicing and the network slicing generated by the application slice controller, the metrics made available to the resource manager periodically, at specific configurable intervals.

7. The method of claim 1, wherein dynamic resource management includes allocating resources in each tier specified by the tier parameter to the corresponding function in an order of cheapest tier first followed by more expensive tier to accommodate changing resource needs.

8. A non-transitory computer-readable storage medium comprising a computer-readable program for specifying and executing an application including multiple microservices on 5G slices within a multi-tiered 5G infrastructure, wherein the computer-readable program when executed on a computer causes the computer to perform the steps of:
   managing compute requirements and network requirements of the application simultaneously by:
      determining end-to-end application characteristics by employing an application slice specification including an application ID component, an application name component, an application metadata component, a function dependencies component, a function instances component, and an instance connections component;
      specifying a function slice specification including a function network slice specification and a function compute slice specification that includes a tier parameter that maps a function across multiple tiers; and
      employing a runtime component including a resource manager, an application slice controller, and an application slice monitor, wherein the resource manager maintains a database and manages starting, stopping, updating, and deleting application instances, the resource manager initially performing static resource management that allocates resources in each tier specified by the tier parameter to a corresponding function according to requirements specified in the function slice specification in an order of cheapest tier first followed by more expensive tier and then performing dynamic resource management across tiers in coordination with the application slice controller and the application slice monitor.

9. The non-transitory computer-readable storage medium of claim 8, wherein the application slice specification includes a latency parameter, a bandwidth parameter, a deviceCount parameter, and a reliability parameter.

10. The non-transitory computer-readable storage medium of claim 8, wherein the function network slice specification includes a latency parameter, a throughputGBR parameter, a throughputMBR parameter, and packetErrorRate parameter.

11. The non-transitory computer-readable storage medium of claim 8, wherein the function compute slice specification further includes a minCPUCores parameter, a maxCPUCores parameter, a minMemory parameter, and a maxMemory parameter.

12. The non-transitory computer-readable storage medium of claim 8, wherein the application slice controller manages compute slicing and network slicing for functions by employing a network slice interface layer providing guarantees and admission control before network slice generation.

13. The non-transitory computer-readable storage medium of claim 12, wherein the application slice monitor monitors and collects metrics for the compute slicing and the network slicing generated by the application slice controller, the metrics made available to the resource manager periodically, at specific configurable intervals.

14. A system for specifying and executing an application including multiple microservices on 5G slices within a multi-tiered 5G infrastructure, the system comprising:
 a memory; and
 one or more processors in communication with the memory configured to:
  manage compute requirements and network requirements of the application simultaneously by:
   determining end-to-end application characteristics by employing an application slice specification including an application ID component, an application name component, an application metadata component, a function dependencies component, a function instances component, and an instance connections component;
  specifying a function slice specification including a function network slice specification and a function compute slice specification that includes a tier parameter that maps a function across multiple tiers; and
  employing a runtime component including a resource manager, an application slice controller, and an application slice monitor, wherein the resource manager maintains a database and manages starting, stopping, updating, and deleting application instances, the resource manager initially performing static resource management that allocates resources in each tier specified by the tier parameter to a corresponding function according to requirements specified in the function slice specification in an order of cheapest tier first followed by more expensive tier and then performing dynamic resource management across tiers in coordination with the application slice controller and the application slice monitor.

15. The system of claim 14, wherein the application slice specification includes a latency parameter, a bandwidth parameter, a deviceCount parameter, and a reliability parameter.

16. The system of claim 14, wherein the function network slice specification includes a latency parameter, a throughputGBR parameter, a throughputMBR parameter, and packetErrorRate parameter.

17. The system of claim 14, wherein the function compute slice specification further includes a minCPUCores parameter, a maxCPUCores parameter, a minMemory parameter, and a maxMemory parameter.

18. The system of claim 14,
 wherein the application slice controller manages compute slicing and network slicing for functions by employing a network slice interface layer providing guarantees and admission control before network slice generation; and
 wherein the application slice monitor monitors and collects metrics for the compute slicing and the network slicing generated by the application slice controller, the metrics made available to the resource manager periodically, at specific configurable intervals.

* * * * *